(12) United States Patent
Ossolinski

(10) Patent No.: US 7,246,913 B2
(45) Date of Patent: Jul. 24, 2007

(54) MOBILE LIGHTING SYSTEM

(75) Inventor: George Ossolinski, New South Wales (AU)

(73) Assignee: Lunar Lighting Balloons Australasia Pty Ltd., North South Wales (AU)

( * ) Notice: Subject to any disclaimer, the term of this patent is extended or adjusted under 35 U.S.C. 154(b) by 83 days.

(21) Appl. No.: 10/991,701

(22) Filed: Nov. 17, 2004

(65) Prior Publication Data

US 2005/0063189 A1    Mar. 24, 2005

(30) Foreign Application Priority Data

May 19, 2003    (WO) ............... PCT/AU03/00599

(51) Int. Cl.
*F21V 33/00*    (2006.01)
(52) U.S. Cl. ........................ 362/96; 362/363
(58) Field of Classification Search ............. 362/96, 362/363, 431, 385; 446/220, 485, 486; 40/214; 244/33

See application file for complete search history.

(56) References Cited

U.S. PATENT DOCUMENTS

| 5,524,398 | A |   | 6/1996  | Miller et al. |         |
|-----------|---|---|---------|---------------|---------|
| 5,782,668 | A |   | 7/1998  | Chabert       |         |
| 5,980,070 | A | * | 11/1999 | Hulse et al.  | 362/385 |
| 6,012,826 | A | * | 1/2000  | Chabert       | 362/363 |
| 6,117,030 | A |   | 9/2000  | Green, Sr.    |         |
| 6,142,415 | A | * | 11/2000 | Ambrico       | 244/33  |
| 6,238,067 | B1 | * | 5/2001  | Hirsch       | 362/352 |
| 6,305,827 | B1 | * | 10/2001 | Nolle        | 362/352 |
| 6,316,878 | B1 |   | 11/2001 | Tsukada      |         |
| 6,470,580 | B1 | * | 10/2002 | Ushihara et al. | 33/366.24 |
| 6,590,323 | B1 | * | 7/2003  | Stekelenburg | 313/318.01 |

FOREIGN PATENT DOCUMENTS

| FR | 2743863      | 7/1997  |
|----|--------------|---------|
| FR | 2761456 A1   | 10/1998 |
| FR | 2 825 973    | 12/2002 |
| GB | 1086623      | 10/1967 |
| SE | 455588       | 7/1988  |
| WO | WO 94/25952  | 11/1994 |
| WO | WO 02/44613 A1 | 6/2002 |
| WO | WO 02/063207 | 8/2002  |

* cited by examiner

*Primary Examiner*—Thomas M. Sember
*Assistant Examiner*—Julie A. Shallenberger
(74) *Attorney, Agent, or Firm*—Knobbe Martens Olson & Bear LLP

(57) ABSTRACT

A portable lighting apparatus includes an envelope which contains a frame supporting an illuminating device typically an electric light bulb inside the envelope. The envelope is mounted on a telescopic mast supported by a movable base element incorporating stabilising legs. The envelope may be inflatable or rigid. For an inflatable envelope, various sensors are provided for sensing deformation of the envelope and/or pressure in the envelope including a photosensor. A means to supply air or other gas to inflate the envelope are provided. A rigid envelope formed from two conjoined sheets of acrylic deformed into dome shapes is also disclosed which overcomes many of the problems of inflatable envelopes particularly, their slow inflation rate, the tendency to deform due to air currents and the adverse effect of punctures. Although a fan is not required for inflation of the rigid envelope fan forced air is preferred for cooling the electric light bulb.

13 Claims, 4 Drawing Sheets

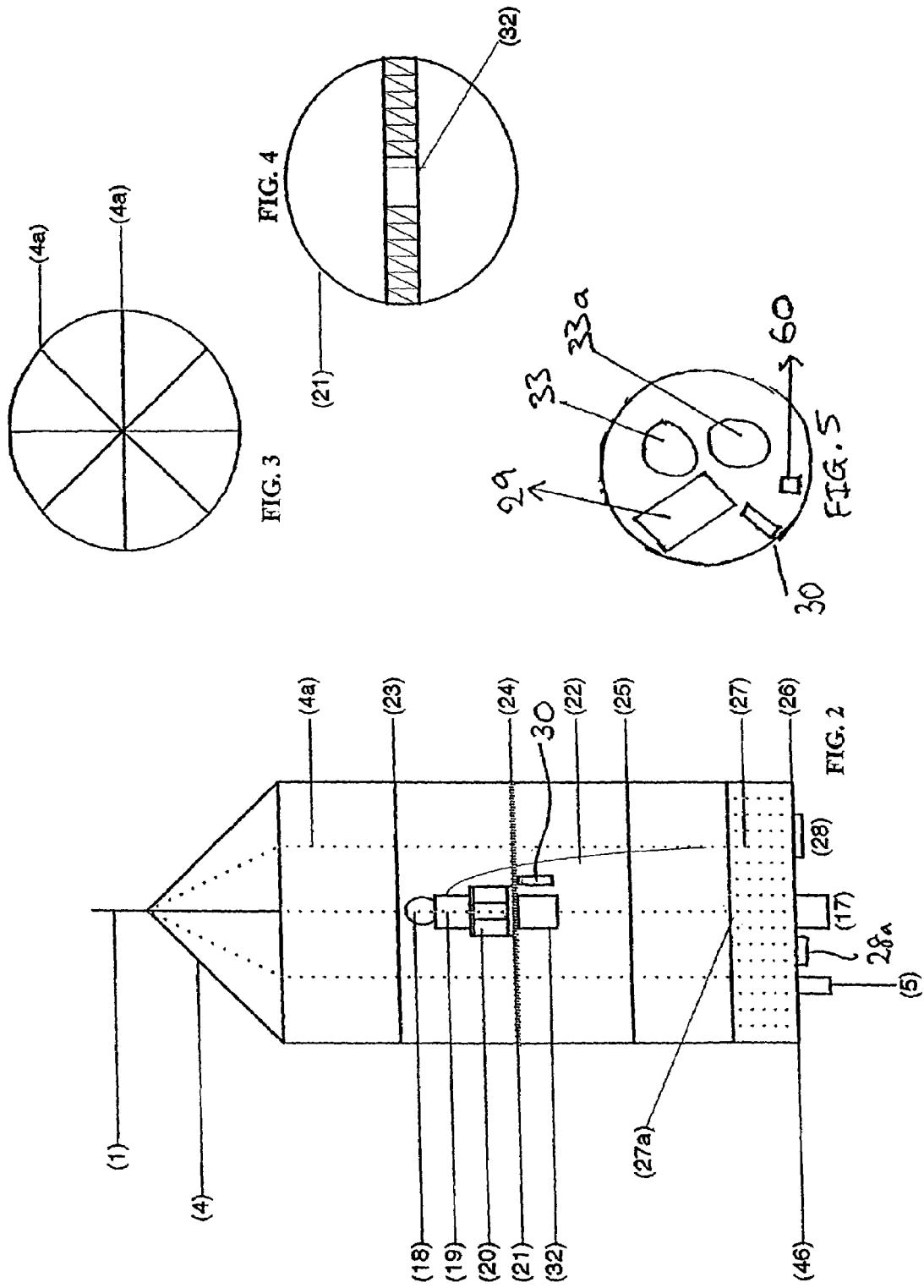

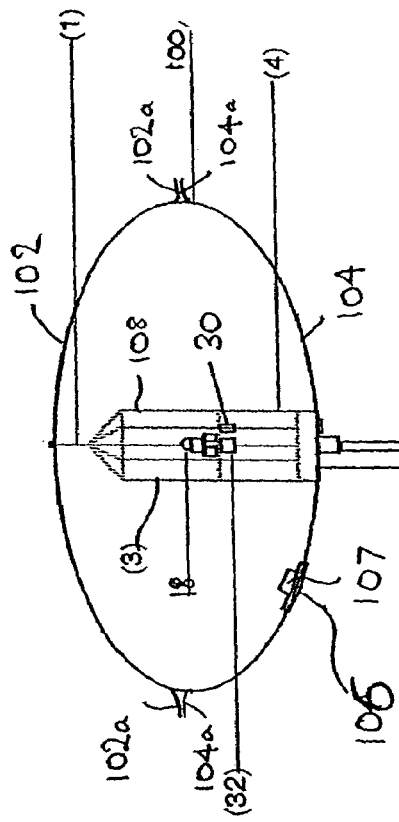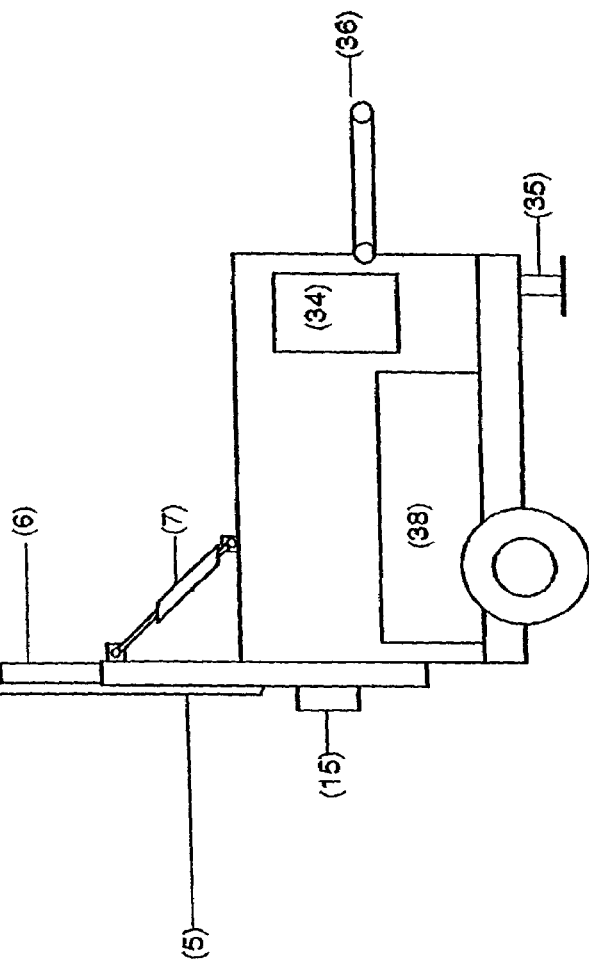
FIG. 10

MOBILE LIGHTING SYSTEM

CROSS REFERENCE TO RELATED APPLICATIONS

This application claims priority to PCT/AU03/00599 filed May 19, 2003.

FIELD OF THE INVENTION

This invention relates to an improved portable lighting system as well as to a new permanent or portable lighting system. In particular, the invention relates to an illuminating balloon which includes an envelope. The envelope contains an illuminating device incorporating an electric bulb or the like and means for keeping the envelope inflated, typically using air, and for supplying power to the light bulb.

BACKGROUND OF THE INVENTION

It is known to provide a balloon comprising an inflatable envelope which is inflated with a gas such as air or helium, place a light source in the balloon and tether the balloon to the ground using an elongate element keeping the balloon at a certain height above the ground. Such balloons are used either for decoration, for carrying advertisements where the envelope or fabric of the balloon carries such an advertisement or for the provision of a diffused light source which may for example be needed for filming, photography, civil works, construction, or for use by emergency services.

It is known to provide such inflatable balloons with a deformation sensing means such that if the balloon loses pressure and deforms, the power to the light bulb is cut for safety reasons. However, there are a number of problems with such balloons.

Inflatable balloon envelopes tend to deform quite readily when subject to relatively strong air currents because of the relatively low pressure setting and even the smallest holes in the envelope may cause the safety circuit to cut power to the bulb. In more adverse conditions, illuminated balloons switch off more often and provide unsatisfactory lighting. The prior art deflection systems are typically mechanical systems such as the filar elements of U.S. Pat. No. 5,782,668 and are unreliable, over-sensitive and difficult to adjust.

The current method of supporting large inflatable lighting balloons is to rig the balloons onto scaffolding which is then supported by a cherry picker, this arrangement also being referred to below as a conventional lighting tower.

This method is awkward to use and is not well suited to many applications, particularly when reliable and quick anchoring of the balloons is required.

A second problem with existing conventional lighting towers is that a very heavy base is required. A conventional mines lighting tower may weigh up to 5000 Kg.

There is a third problem with existing inflatable balloon systems and that is their slow inflation rate and noisy operation which is a particular problem when filming.

The aim of the present invention is to ameliorate or at least alleviate the above mentioned disadvantages of the prior art.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed in Australia before the priority date of each claim of this application.

SUMMARY OF THE INVENTION

In a first aspect of the present invention there is provided a transportable lighting apparatus including an envelope which contains a frame supporting an illuminating device inside the envelope characterised in that the envelope is mounted on a mast comprising an extendible telescopic shaft, the mast being mounted on and supported from a transportable base element incorporating a power supply for supplying electrical power to the illuminating device and having stabilising legs and in that a support arm extends from the mast to the base element and wherein the apparatus includes means for sensing deformation of the envelope comprising an LED emitting infrared light and a photo diode sensing cell for sensing infrared light reflected by the interior of the envelope and arranged to cut-off electrical power to the illuminating device when the envelope deflects inwards by more than a predetermined distance.

The LED may emit light in the range of 800 nm to 1000 nm, more preferably 850 nm to 910 nm, most preferably about 880 nm.

Surprisingly the inventor has found that, despite the presence of a significant light source inside the balloon a reflected light based deflector detection system will work obviating the need for the unreliable mechanical based deflection systems of the prior art.

Typically the base element is a trailer and there are four hydraulically operated stabilising legs or "out riggers" extending from the trailer. Manually operated legs may also be provided.

The legs make the trailer more stable and able to cope with any horizontal wind loads which the apparatus may be subjected to.

The lighting apparatus of the present invention may typically weigh about 1000 Kg—a fraction of the 5000 Kg that conventional lighting towers may weigh.

In a related aspect, the invention provides a transportable lighting apparatus comprising a non-inflatable permanent rigid translucent envelope which is rigid and retains its shape, and which contains a frame supporting an illuminating device inside the envelope for supplying diffuse light. The use of a rigid envelope overcomes many of the problems of the prior art inflatable envelopes particularly, their slow inflation rate, the tendency to deform due to air currents which result in the power supply to the electric bulb being switched off due to their safety mechanism. Punctures also have adverse effects.

Rigid polymer envelopes are also suitable for use at high altitudes where the air is less dense and zero temperatures and high winds are prevalent and where inflatable envelopes are not suitable for use.

By using a rigid envelope, although a fan is not required for inflation of the envelope in contrast with inflatable envelopes, however fan forced air is preferred for cooling purposes. Also no sensors are required to detect deformation of the balloon envelope as it is composed of a rigid construction. Typically, two independently operable fans are provided, each having their own safety circuit, arranged to cut power to the bulb if both fans fail.

The envelope is preferably made of a polymer most preferably a clear acrylic or polycarbonate. Typically the envelope is formed by slump moulding two sheets of clear acrylic into dome shapes and joining the two deformed sheets to form an ellipsoid. The interior surface of the upper dome is preferably coated with a UV resistant silver reflective polyurethane spray paint and the lower dome is treated to provide diffused light by frosting the acrylic (by sandblasting or the like). Alternatively the lower dome is coated with a UV resistant manufactured textile to act as a diffuser and provide glare free light.

In a preferred embodiment an entry hole or door is provided to access the interior of the envelope for replacement of the bulb. Preferably, the entry door includes an exhaust vent covered by a protective filter for expelling hot air generated by the bulb.

The support frame for the rigid envelope is preferably made from stainless steel.

A third aspect of the present invention provides a portable lighting apparatus including an inflatable envelope which contains an illuminating device incorporating an electric bulb or the like, means for keeping the envelope inflated, typically using air, and means for supplying power to the light bulb characterised by a variable pressure control means for sensing deflation of the balloon envelope.

Ideally, the variable pressure control means is located beneath the illuminating means which is located in the centre of the inflatable envelope.

The variable pressure gauge allows the pressure to be set according to the working conditions where the lighting apparatus is being utilised.

The balloon preferably also incorporates two variable speed fans so the fans can be set at low speed when the apparatus is required to operate quietly as is required for filming. When the fan runs at low speed the variable pressure gauge can be set to tolerate larger drops in pressure to prevent safety cut-out due to the low fan speed.

By reducing the fan speed and increasing the pressure setting on the pressure sensor, the noise of the fan can be dramatically reduced.

In one embodiment a cover, typically made from polycarbonate lined with a sound absorbing material, may be placed over the base plate. The cover defines two air intake apertures and quietens the fans without compromising the pressure inside the inflatable envelope. This is important when the apparatus is used out doors especially in windy conditions where the balloon needs to be firm enough to withstand horizontal wind loads.

A fourth aspect of the present invention provides a portable lighting apparatus including an inflatable envelope which contains an illuminating device incorporating an electric bulb or the like means for keeping the envelope inflated, typically using air, and for supplying power to the light bulb characterised by a level detector in form of a reed switch for sensing deformation of the balloon.

In a preferred feature, two mini compressors can be used to inflate the balloon, thereby halving the inflation time. Once the balloon is inflated, the pressure created inside the envelope is sufficient to stop the safety sensors from cutting power to the bulb in high wind conditions.

It is to be noted that the different aspects of the invention can be used independently or in conjunction with one another, although only one of the third fourth and fifth aspects would be required in a balloon as part of a safety cut-out system.

BRIEF DESCRIPTION OF THE DRAWINGS

A specific embodiment of the invention will now be described by way of example only and with reference to the accompanying drawings in which:

FIG. 2 is a enlarged view of a support frame or cage which forms part of the lighting system as shown in FIG. 1;

FIG. 3 is a view of the top of the cage shown in FIG. 2;

FIG. 4 is a plan view of a plate which forms part of the cage;

FIG. 5 is a plan view of the base of the cage; and

FIG. 10 shows an alternative embodiment of the present invention incorporating a different type of trailer and a rigid polymer envelope.

DETAILED DESCRIPTION OF A PREFERRED EMBODIMENT

Figure 1:
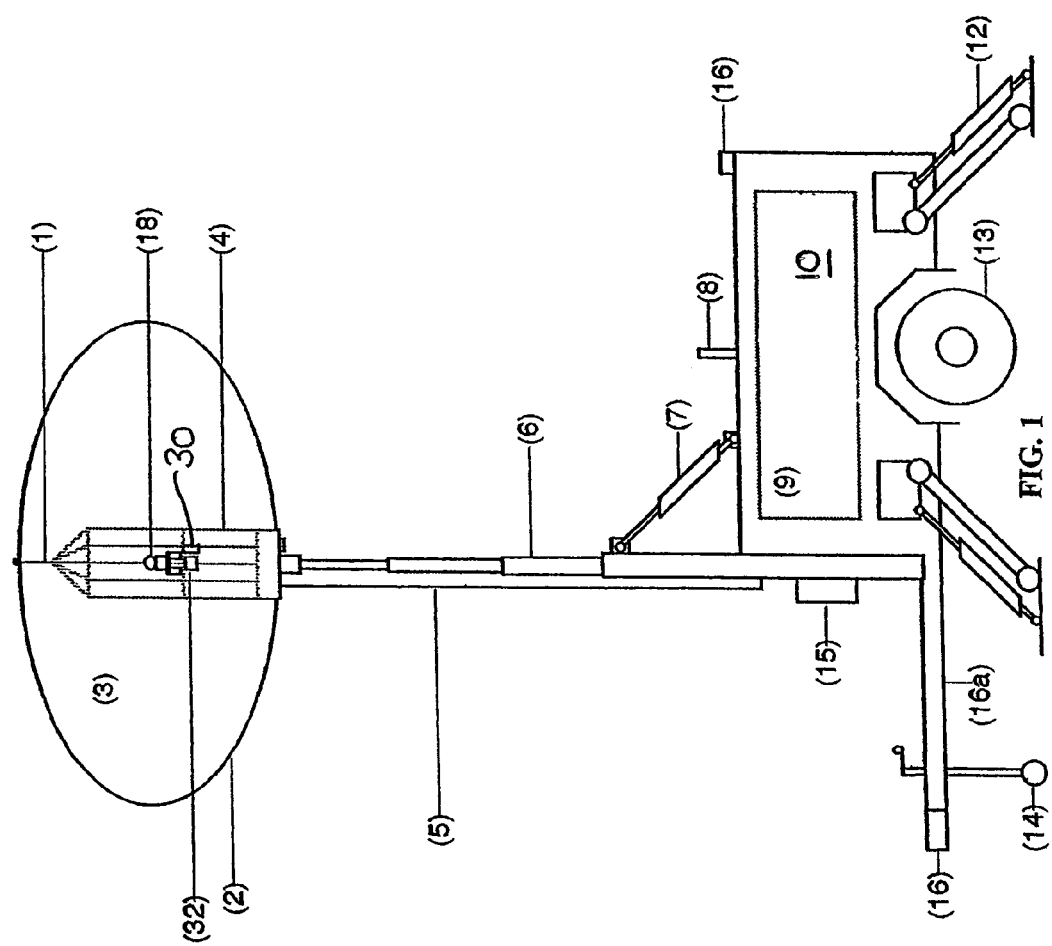
FIG. 1 is a schematic side view of a portable lighting system embodying the present invention.

With reference to the drawings, FIG. 1 shows a portable lighting system generally including an inflatable envelope or balloon 2. Inside the balloon there is located an aluminium support frame or cage 4 from the top of which one aluminium rod 1 extends to make an oval envelope/balloon. Two such rods 1 joined end on end can be used to increase the height of the balloon to make it generally spherical. A light head 3 is located inside the cage.

The inflatable balloon 2 and the support frame 4 are mounted on one end of a mast 6 which has four telescopically slidable sections and is ten metres tall when fully extended. The mast is mounted on a trailer 16. A hydraulic ram 7 extends between the lowermost section of the mast 6 and the top of the trailer 16 for use in lifting the mast into a vertical upright position as shown in FIG. 1. The mast can be retracted and folded onto the top of the trailer when not in use.

The trailer 16 includes a tow bar 16a jockey wheel 14 and a hydraulic or electric winch 15 for raising and lowering the telescopic mast 6. Inside the trailer there is an enclosure 9 inside which there is located a diesel electric or petrol powered generator 10 for generating electricity to operate the winch and light head. An exhaust 8 is provided for venting combustion gases from the engine out of the trailer.

Four hydraulically operated legs 12 are provided which extend out from four corners of the trailer for the purpose of stabilising the trailer and supporting the mast and envelope. These make the trailer more stable for horizontal loads.

FIGS. 2 to 5 illustrate the support frame or cage 4 in which various components of the lighting system are enclosed, in more detail. The support frame 4 comprises a cage element comprising a series of eight vertically extending metal rods 4a connected by vertically spaced apart metal rings 23, 24, 25, 26.

In the centre of the support frame 4, there is the light head comprising a lamp bulb 18 mounted on a lamp base 19 which sits on top of rubber mounts which act as vibration absorbers which are located on plastic plates 20 which in turn sit on top of a metal plate 21. Underneath the metal plate 21 a variable pressure control 32 is located. This arrangement is shown from above in FIG. 4.

At the base of the support frame, there is a clear plastic enclosure 27 having an annular cross section formed of a UV resistant polycarbonate whose top is partly closed defining a central circular aperture 27a. This as is described in more detail below, has the function of directing air towards the globe for cooling and inflating the balloon.

At the base 46 of the frame, there is located two external air intakes 28 and 28a which include a filter, and a support bar 17 having an annular cross section which attaches to the top section of the telescopic mast 6. Also attached to the base of the support frame 4, is a detachable lead 5 which carries electric power from the ballast to the light head inside the envelope.

Figure 9:
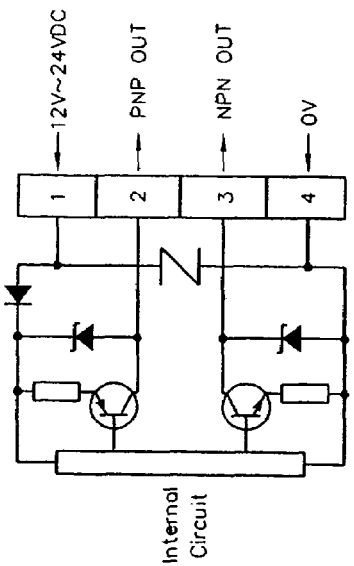
FIG. 9 is a circuit diagram of the photosensor of FIG. 6.
Figure 8:
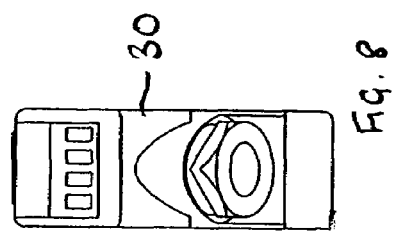
FIG. 8 is a front view of the photosensor of FIG. 6.
Figure 6:
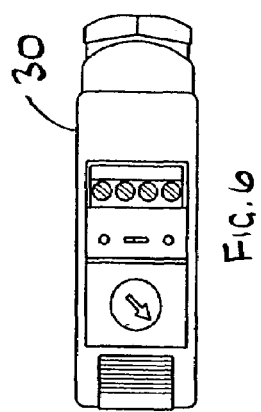
FIG. 6 is a plan view of a photosensor.
Figure 7:
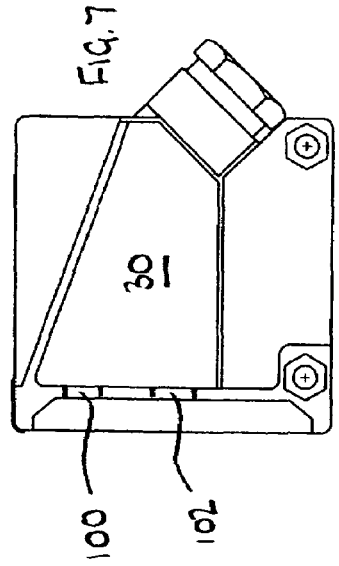
FIG. 7 is a side view of the photosensor of FIG. 6.

Located inside the enclosure and support frame and as is best seen in FIG. 5. there is variable speed fans 33, 33a located above the air intakes 28 28a, a proximity sensor 30, an igniter 29, a level sensor 60. The level sensor is a reed switch which extends from inside the base of the clear plastic enclosure 27 and protrudes over the envelope and allows power to the bulb when the envelope is inflated. The proximity sensor 30 can be located just inside the enclosure 27 or next to the pressure sensor 32. The proximity sensor 30 comprises a photosensor which includes an LED 100 which shines light towards the interior of the envelope which is reflected back by the interior of the envelope to a sensor/detector 102 located adjacent the LED. The distance of the envelope to the 102 detector is calculated by internal circuitry using the difference in emitted and reflected light angles thus indicating the distance the envelope is from the sensor and hence the state of inflation of the envelope. If the distance is less than a predetermined distance, depending on the size of the envelope, the photosensor is arranged to cut-off the electrical power supply to the bulb. The photosensor is mounted inside the centre of the balloon. Suitable photosensors are manufactured by Takenaka Industrial Co Ltd of Japan. FIG. 9 is a schematic circuit diagram of the photosensor.

The variable pressure gauge 32 allows the pressure to be set according to the working conditions where the lighting apparatus is located. The pressure can also be controlled by adjusting the settings of the variable speed fans 33 and 33a, which lowers the noise levels of the fan and makes the system more suitable for use in filming.

FIG. 10 shows an alternative variant of the embodiment shown in FIG. 1 in which the balloon is carried on a portable trolley 36 which is approximately one third of the weight of the trailer as shown in FIG. 1 and includes a generator and alternator 38, a fuel tank 34, and telescopic mast 6.

In FIG. 10 the envelope 100 is a rigid transparent ellipsoid instead of being inflatable. The envelope is made from clear sheets of a polymer most preferably a clear acrylic although polycarbonate may also be used. The sheets are about 4-5 mm thick. The envelope is formed by slump moulding the two sheets of clear acrylic into dome (semi-ellipsoid) shapes 102, 104, defining flanges 102a, 104a, and joining the two deformed sheets by bolting the flanges together to form an ellipsoid. The interior surface of the upper dome is preferably coated with a UV resistant silver reflective polyurethane spray paint and the lower dome is frosted to provide diffused light by sandblasting or any other suitable process. Alternatively the lower dome may be coated with a UV resistant manufactured textile to act as a diffuser and provide glare free light.

Alternatively the upper sheet 102 may comprise a non-transparent, preferably reflective material, such as stainless steel.

An entry door 106 is provided to access the interior of the envelope for replacement of the bulb 18. In the entry door there is an exhaust vent 107 for the expulsion of hot air generated by the light bulb 18. A filter over the hole prevents foreign objects such as insects from entering the envelope.

The support frame 108 of the rigid envelope is made from stainless steel.

Although the rigid envelope does not require air to inflate it, it does require fan forced air for cooling the bulb in particular and dispersing heat which is done via the exhaust vent in the entry door as described above. Two independently operable fans are provided, each having their own safety circuit, arranged to cut power to the bulb only if both fans fail.

Clearly a lighting system incorporating a rigid balloon is more suited to permanent installation than to temporary installation.

The rigid polymer envelope 100 may also be used with the trailer of FIG. 1 instead of the inflatable envelope 2.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A transportable lighting apparatus including an inflatable envelope which contains a frame supporting an illuminating device inside the envelope characterised in that the envelope is mounted on a mast comprising an extendible telescopic shaft, the mast being mounted on and supported from a transportable base element incorporating a power supply for supplying electrical power to the illuminating device, the base having stabilising legs, and wherein a support arm extends from the mast to the base element and wherein the apparatus includes means for sensing deformation of the envelope comprising an LED emitting infrared light and a photo diode sensing cell for sensing infrared light reflected by the interior of the envelope and arranged to cut-off electrical power to the illuminating device when the envelope deflects inwards by more than a predetermined distance, and wherein the apparatus incorporates two variable speed fans for inflating the envelope.

2. A transportable lighting apparatus as claimed in claim 1 wherein the LED emits light having a wavelength in the range of 800 nm to 1000 nm.

3. A transportable lighting apparatus as claimed in claim 2 wherein the LED emits light having a wavelength in the range of 850 nm to 910 nm.

4. A transportable lighting apparatus as claimed in claim 3 wherein the LED emits light having a wavelength of about 880 nm.

5. A transportable lighting apparatus as claimed in claim 1 wherein the base element is a trailer or trolley and there are four stabilising legs extending from the trailer.

6. A transportable lighting apparatus as claimed in claim 1 wherein the apparatus includes a fan for keeping the envelope inflated with air, and including a variable pressure control means including a pressure sensor for sensing deflation of the balloon envelope and cutting power to the illuminating device in the event of deflation or loss of pressure.

7. A transportable lighting apparatus as claimed in claim 1 further including a level detector in the form of a reed switch for sensing inflation of the balloon.

8. A transportable lighting apparatus including an inflatable envelope which contains a frame supporting an illuminating device inside the envelope characterised in that the envelope is mounted on a mast supported from a base element incorporating a power supply for supplying electrical power to the illuminating device and wherein the apparatus includes means for sensing deformation of the envelope comprising an LED emitting infrared light in the range of 800 nm to 1000 nm and a photo diode sensing cell for sensing infrared light reflected by the interior of the envelope and arranged to cut-off electrical power to the illuminating device when the envelope deflects inwards by more than a predetermined distance.

9. A transportable lighting apparatus as claimed in claim 8 wherein the LED emits light having a wavelength in the range of 850 nm to 910 nm.

10. A transportable lighting apparatus as claimed in claim 8 wherein the LED emits light having a wavelength of about 880 nm.

11. A transportable lighting apparatus as claimed in claim 1 wherein the apparatus incorporates two fans.

12. A transportable lighting apparatus as claimed in claim 8 wherein the inflatable envelope is ellipsoidal, when inflated.

13. A transportable lighting apparatus as claimed in claim 1 wherein the inflatable envelope is ellipsoidal, when inflated.

* * * * *

UNITED STATES PATENT AND TRADEMARK OFFICE
CERTIFICATE OF CORRECTION

PATENT NO. : 7,246,913 B2
APPLICATION NO. : 10/991701
DATED : July 24, 2007
INVENTOR(S) : George Ossolinski It is certified that error appears in the above-identified patent and that said Letters Patent is hereby corrected as shown below:

At column 1, item (73), Assignee: please delete "North" and insert -- New --, therefore.

At column 1, after item (65) and before item (30) please insert:

-- Related U.S. Application Data

(60) This application is a continuation-in-part of PCT/AU03/00599. --.

At column 1, item (30), please delete "May 19, 2003 (WO) ....... PCT/AU03/00599" and insert -- May 30, 2002 (AU) ...... PS 2419 --, therefore.

Signed and Sealed this

Twenty-fifth Day of May, 2010

David J. Kappos
*Director of the United States Patent and Trademark Office*